(12) United States Patent
Muendel et al.

(10) Patent No.: US 9,397,464 B2
(45) Date of Patent: Jul. 19, 2016

(54) FIBER LASER ASSEMBLY AND METHOD OF GENERATING LIGHT

(71) Applicant: Lumentum Operations LLC, Milpitas, CA (US)

(72) Inventors: Martin H. Muendel, Oakland, CA (US); Xiuquan Ma, Fremont, CA (US); Kai-Hsiu Liao, Mountain View, CA (US); Matthew Kutsuris, Dublin, CA (US)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 14/576,335

(22) Filed: Dec. 19, 2014

(65) Prior Publication Data

US 2016/0181756 A1    Jun. 23, 2016

(51) Int. Cl.
*H01S 3/30* (2006.01)
*H01S 3/067* (2006.01)
(Continued)

(52) U.S. Cl.
CPC ............ *H01S 3/06708* (2013.01); *H01S 3/091* (2013.01); *H01S 3/0804* (2013.01); *H01S 3/08018* (2013.01); *H01S 3/08022* (2013.01); *H01S 3/10* (2013.01)

(58) Field of Classification Search
CPC . H01S 3/0057; H01S 3/06712; H01S 3/0675; H01S 3/06754; H01S 3/094019; H01S 3/06725; H01S 3/1106; H01S 3/1305; H01S 3/005; H01S 3/0092; H01S 3/06704; H01S 3/08059; H01S 3/1118; H01S 3/1618; H01S 3/06708; H01S 3/091

USPC ............................................................. 372/6
See application file for complete search history.

(56) References Cited

U.S. PATENT DOCUMENTS 6,631,224 B2   10/2003  Sorin et al. ....................... 385/28
8,521,038 B1    8/2013  Wach ............................ 398/200
(Continued)

FOREIGN PATENT DOCUMENTS

| CN | 101841124 | 9/2010 | ............... H01S 5/00 |
| WO | 2013152862 | 10/2013 | ............. H01S 3/067 |
| WO | 2014145426 | 9/2014 | ............... G02B 6/02 |

OTHER PUBLICATIONS

"Experimental observations of the threshold-like onset of mode instabilities in high power fiber amplifiers" Eidam et al. Optics Express, vol. 19, Issue 14, pp. 13218-13224, 2011.
(Continued)

*Primary Examiner* — Xinning Niu
*Assistant Examiner* — Vu A Vu
(74) *Attorney, Agent, or Firm* — Harrity & Harrity, LLP

(57) ABSTRACT

A modal instability of a fiber amplifier may be reduced by coupling, e.g. splicing, a length of passive multimode optical fiber to an active multimode optical fiber of the fiber amplifier. Upon launching light into the passive optical fiber, some higher order transversal modes may be excited in the passive optical fiber. The higher-order modes may interfere with the fundamental mode in the passive multimode optical fiber. However, the intermodal interference of the launched modes does not cause thermal gradients in the passive optical fiber. Upon propagation in the passive multimode optical fiber, the excited optical modes may lose mutual coherence, causing a reduction of contrast of the intermodal interference pattern along the doped core of the active optical fiber, effectively reducing modal instability in the active optical fiber.

20 Claims, 6 Drawing Sheets

(51) Int. Cl.
*H01S 3/091* (2006.01)
*H01S 3/08* (2006.01)
*H01S 3/10* (2006.01)

(56) References Cited

U.S. PATENT DOCUMENTS

| | | | |
|---|---|---|---|
| 8,582,609 B2 * | 11/2013 | Tong | H01S 3/06704 372/29.021 |
| 8,654,800 B2 | 2/2014 | Yagodkin et al. | 372/6 |
| 2011/0058250 A1 | 3/2011 | Liu et al. | |
| 2012/0230352 A1 | 9/2012 | Minelly et al. | 372/6 |
| 2013/0215914 A1 * | 8/2013 | Imai | B23K 26/0613 372/6 |
| 2013/0301116 A1 | 11/2013 | Kliner et al. | |
| 2014/0029084 A1 | 1/2014 | Kashiwagi | |
| 2014/0168755 A1 * | 6/2014 | Clowes | H01S 3/0057 359/341.1 |
| 2014/0218788 A1 * | 8/2014 | Gapontsev | H01S 3/06754 359/326 |

OTHER PUBLICATIONS

Extended European Search report corresponding to EP 15198185.9, mailed May 5, 2016, 9 pages.

* cited by examiner

FIBER LASER ASSEMBLY AND METHOD OF GENERATING LIGHT

TECHNICAL FIELD

The present disclosure relates to light sources, and in particular to fiber lasers, amplifiers, and methods of generating light using fiber lasers and amplifiers.

BACKGROUND

Fiber lasers provide significant advantages of efficiency and practicality in comparison with other laser types such as free-space lasers. In fiber lasers and amplifiers, light is guided by an "active" fiber core typically doped with ions of a rare-earth element, such as Ytterbium, which provides optical gain. The guiding property of the doped fiber core considerably relaxes requirements of optical alignment. It also allows one to increase the length of the gain medium to tens and even hundreds of meters, resulting in very high achievable optical gains.

With the advent of a double-clad fiber (DCF), fiber lasers have been scaled to kilowatt (kW) power levels. In a DCF, pump light propagates in a relatively large inner cladding, typically 125 to 600 micrometers in diameter, surrounding the doped core. The doped core has a much smaller diameter, e.g. 5 to 100 micrometers. The laser light propagates in the doped core. The inner cladding guides the pump light along the doped core, enabling the pump light to be efficiently absorbed in the doped core on the entire fiber length, causing laser light amplification to be distributed along the entire fiber length.

In a regime of high average power levels, fiber or other waveguide lasers and amplifiers may show a so-called modal instability. Modal instability may cause the laser light to be scattered into higher-order core modes and even cladding modes, thus causing a major degradation in either beam quality, usable power, or both. This instability has been studied in lasers generating sub-microsecond pulses at average powers of greater than about 100 W using large-mode-area fibers of various designs. By way of example, Eidam et al. in an article entitled "Experimental observations of the threshold-like onset of mode instabilities in high power fiber amplifiers", Optics Express, Vol. 19, Issue 14, pp. 13218-13224, 2011, describe a possible mechanism of a modal instability. This mechanism includes creating temperature gradients along the laser fiber due to interference of transversal lasing modes. The temperature gradients cause modulations of refractive index along the laser fiber, which in their turn increase energy coupling from a fundamental lasing mode into higher order transversal lasing modes, causing more modal interference, and accordingly more thermal variations along the laser fiber. Essentially, a runaway process develops, in which light energy is coupled out of fundamental lasing mode, degrading the laser beam quality and reducing the output optical power.

Various methods have been suggested to reduce modal instability in high power fiber lasers. For example, the entire length of the fiber laser may be actively temperature stabilized to counter the formation of the temperature gradients creating the modulations of refractive index, in an attempt to hold back the above described runaway process. Alternatively, a fiber laser cavity may be extended with temperature controlled portions, the optical length of which is dynamically adjusted to cause a destructive optical interference of higher-order modes, thus reducing a coefficient of cross-coupling between the fundamental and higher-order modes. However, in practice, these methods have not been successful in substantially suppressing modal instability.

SUMMARY

In accordance with one aspect of the present disclosure, a modal instability of a fiber amplifier may be reduced by coupling, e.g. splicing, a length of passive multimode optical fiber to an active multimode optical fiber of the fiber amplifier. Light guiding properties and/or mechanical parameters of the passive optical fiber may be substantially matched to those of the active optical fiber. Signal light to be amplified is launched into the passive optical fiber instead of launching it directly into the active optical fiber. Upon launching the signal light into the passive optical fiber, some higher order transversal modes may be excited in the passive optical fiber, or they may be already present in the signal light before launching into the passive optical fiber, e.g. from a multimode fiber laser oscillator. The higher-order modes may still interfere with the fundamental mode in the passive multimode optical fiber. However, the intermodal interference of the launched modes does not cause thermal gradients in the passive optical fiber, due to the absence of a doped fiber core in the passive optical fiber.

Upon propagation in the passive multimode optical fiber, the excited modes tend to lose mutual coherence. This may happen because the signal light typically has a non-zero spectral width, and accordingly a finite coherence length. Different transversal modes travel different optical path lengths in the passive multimode optical fiber due to the phenomenon of intermodal dispersion. Thus, these modes are coupled into the active optical fiber with at least partially lost mutual coherence. Reduction of the intermodal coherence causes a reduction of contrast of the intermodal interference pattern along the doped core of the active optical fiber, which may suppress, or at least lessen, modulations of refractive index along the active fiber, causing a reduction of modal instability in the active optical fiber.

In accordance with an aspect of the present disclosure, there is provided a fiber laser assembly comprising:

a light source for emitting signal light having a non-zero spectral width;

a length of passive multimode optical fiber between first and second ends thereof, optically coupled at the first end thereof to the light source for receiving the signal light and propagating the signal light in a zero-order optical mode and a higher-order optical mode in the passive multimode optical fiber towards the second end thereof, wherein upon such propagation, one of the zero-order and higher-order optical modes is delayed with respect to the other optical mode, so as to at least partially reduce coherence therebetween at the second end of the passive multimode optical fiber; and a length of active multimode optical fiber between first and second ends thereof, optically coupled at the first end thereof to the second end of the passive multimode optical fiber, for receiving and amplifying the zero-order optical mode as the zero-order optical mode propagates towards the second end of the active multimode optical fiber.

In accordance with the present disclosure, there is further provided a fiber laser assembly comprising:

a light source for emitting signal light having a finite coherence length;

a passive multimode optical fiber having opposed first and second ends and optically coupled at the first end thereof to the light source for receiving the signal light and propagating the signal light in a zero-order optical mode and a higher-order optical mode in the passive multimode optical fiber towards the second end thereof, wherein upon such propagation, one of the zero-order and higher-order optical mode is delayed by a first distance with respect to the other optical mode due to intermodal dispersion in the passive multimode optical fiber, wherein the first distance is at least 1% of the coherence length of the signal light; and an active multimode optical fiber having opposed first and second ends and optically coupled at the first end thereof to the second end of the passive multimode optical fiber, for amplifying the zero-order optical mode as the zero-order optical mode propagates towards the second end of the active multimode optical fiber.

In one embodiment, the length of the passive multimode optical fiber is at least 1 mm. Also in one embodiment, the passive and active multimode optical fibers include outer diameters differing from each other by less than 10%, and/or core numerical apertures differing from each other by less than 10%. The light source may include a fiber laser oscillator e.g. including a length of an active singlemode or multimode optical fiber.

In accordance with another aspect of the present disclosure, there is further provided a method for generating light at over 100 W power level, the method comprising:

(a) providing passive and active multimode optical fibers each having opposed first and second ends;

(b) optically coupling the second end of the passive multimode optical fiber to the first end of the active multimode optical fiber;

(c) coupling signal light having a non-zero spectral width to the first end of the passive multimode optical fiber, thereby causing a zero-order optical mode of the signal light to co-propagate with a higher-order optical mode of the signal light from the first to the second end of the passive multimode optical fiber, wherein upon such propagation, one of the zero-order and higher-order optical mode is delayed with respect to the other, so as to at least partially reduce coherence therebetween due to the non-zero spectral width of the signal light, before the zero-order and higher-order optical modes are coupled to the first end of the active multimode optical fiber; and (d) optically pumping the active multimode optical fiber, so as to amplify the zero-order optical mode as the zero-order optical mode propagates towards the second end of the active multimode optical fiber.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
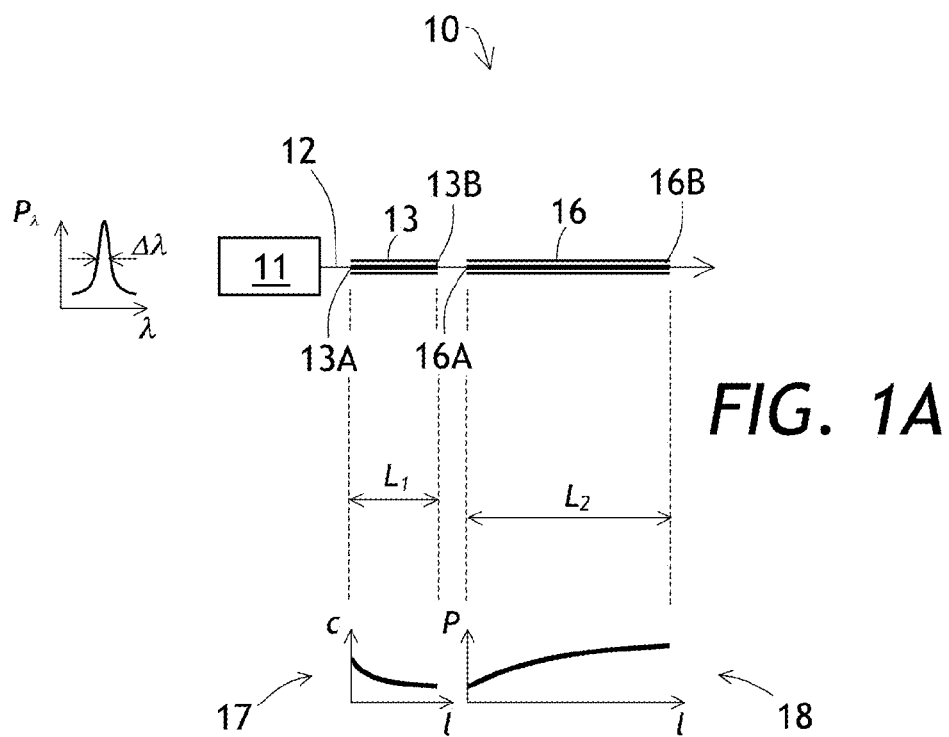
FIG. 1A illustrates a schematic diagram of a fiber laser assembly including passive and active multimode optical fibers.
Figure 1B:
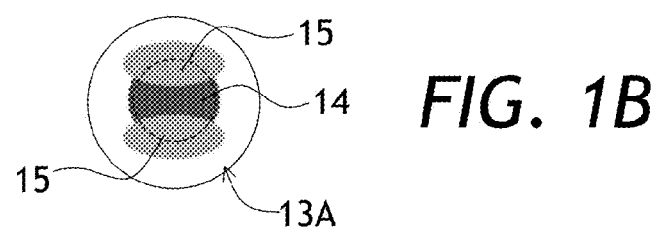
FIG. 1B illustrates an end view of zero-order and higher-order modes of the passive multimode optical fiber shown in FIG. 1A.

Referring now to FIGS. 1A and 1B, a fiber laser assembly 10 (FIG. 1A) may be provided as described below. The fiber laser assembly 10 may include a light source 11 for emitting signal light 12 having a non-zero width $\Delta\lambda$ of a power spectrum $P(\lambda)$ e.g. $\Delta\lambda$ may range from 0.1 nm to 5 nm. A passive multimode optical fiber 13 having a length $L_1$ between first 13A and second 13B ends is provided. The passive multimode optical fiber 13 may be optically coupled at its first end 13A to the light source 11 for receiving the signal light 12 so that the signal light 12 propagates in the passive multimode optical fiber 13. The signal light 12 propagates in a zero-order transversal optical mode 14 (FIG. 1B) and a higher-order transversal optical mode 15 towards the second end 13B of the passive multimode optical fiber 13. In accordance with the present disclosure, upon such propagation, one of the zero-order 14 and higher-order 15 optical modes is delayed with respect to the other optical mode due to the phenomenon of intermodal dispersion in the passive multimode optical fiber 13. As a result, optical coherence c between the zero-order 14 and higher-order 15 optical modes at the second end 13B of the passive multimode optical fiber 13 is reduced. The gradual reduction of the coherence c with a length coordinate l along the passive multimode optical fiber 13 is illustrated by a c(l) dependence 17. The coherence c reduces due to the non-zero spectral width $\Delta\lambda$ of the signal light 12.

An active multimode optical fiber 16 may be provided as shown in FIG. 1A. The active multimode optical fiber 16 may have a length $L_2$ between first 16A and second 16B ends. The active multimode optical fiber 16 may be optically coupled at its first end 16A to the second end 13B of the passive multimode optical fiber 13, for receiving and amplifying the zero-order optical mode 14 as it propagates towards the second end 16B of the active multimode optical fiber 16, as illustrated by a dependence 18 of optical power P of the zero-order optical mode 14 on a length coordinate l along the active multimode optical fiber 16. Herein, the term "active optical fiber" denotes an optical fiber the core of which is doped with an amplifying agent e.g. rare earth ions, when the core is illuminated (pumped) with pump light, not shown in FIG. 1A. The term "multimode optical fiber" means an optical fiber that is capable of propagating more than one transversal core-guided optical mode. Thus, the higher-order optical mode 15 may be amplified by the active multimode optical fiber 16 along with the zero-order optical mode 14. This of course does not mean that more than one mode is always propagates in the fiber. As known to those skilled in the art, under certain conditions a multimode optical fiber can maintain a single core optical mode.

Figure 2A:
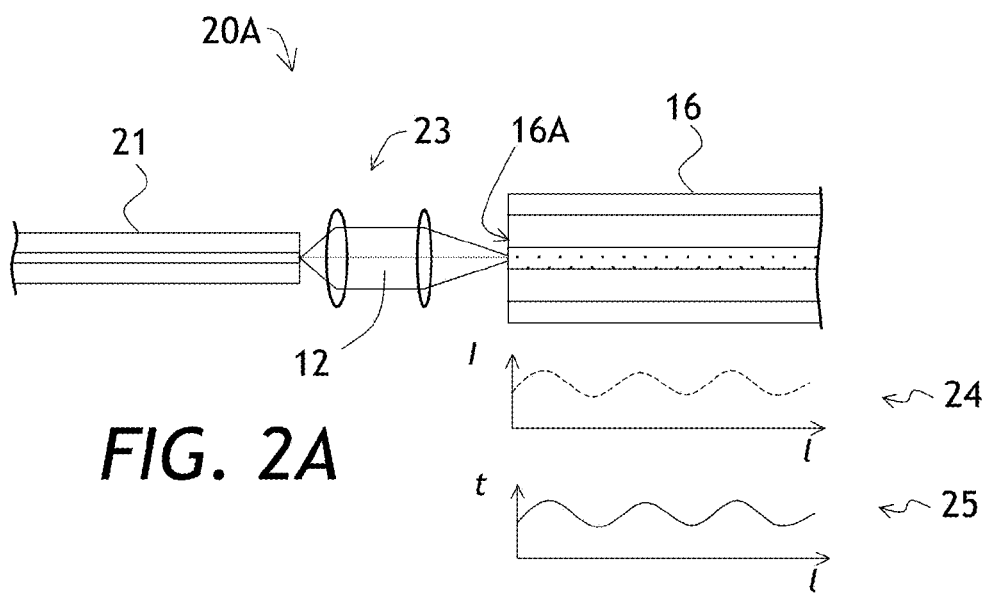
FIG. 2A is a schematic elevational view of a coupler for direct coupling light into an active multimode optical fiber.

To illustrate a role of the passive multimode optical fiber 13 in reducing modal instability in the active multimode optical fiber 16 of the fiber laser assembly 10, an operation of the active multimode optical fiber 16 under high-power conditions will be considered for a case where the signal light 12 is coupled directly into the active multimode optical fiber 16, omitting the passive multimode optical fiber 13. Referring to FIG. 2A, a fiber laser assembly 20A is illustrated. The fiber laser assembly 20A includes an active singlemode optical fiber 21 emitting the signal light 12, which is coupled via a lens system 23 directly into the active multimode optical fiber 16. The passive multimode optical fiber 13 is omitted in the fiber laser assembly 20A. The fiber laser assembly 20A may show a modal instability in the active multimode optical fiber 16. The modal instability may occur as follows.

(1) In addition to a desired main mode of light propagation in the active multimode optical fiber 16, at least one other mode is present in a small quantity, for example due to imperfect matching of the mode size and shape by the lens system 23, which forms a focal spot on the first end 16A of the active multimode optical fiber 16.

(2) The at least two modes, not shown, now propagate in the active multimode optical fiber 16 from its first end 16A towards its second end 16B. The at least two modes interfere with one another, creating an interference pattern 24 (dashed line) with a intensity I(l) periodically varying along the active multimode optical fiber 16.

(3) Due to absorption or gain in the active multimode optical fiber 16, the spatially varying interference pattern 24 generates a periodic, spatially varying temperature pattern t(l) 25 (solid line) in the active multimode optical fiber 16.

(4) Due to the photo-refractive effect, the varying temperature pattern 25 generates a periodic, spatially varying refractive index profile (i.e. a refractive index grating; not shown) in the active multimode optical fiber 16.

(5) The refractive-index grating causes light in a fundamental fiber mode to be coupled into other modes, as well as possibly into other modes including non-core (i.e. cladding) modes.

(6) At sufficiently high average operating power, the refractive index grating becomes strong enough for a large proportion of the main mode to couple out of that mode, possibly in a temporally transient, oscillatory, or chaotic fashion.

Figure 2B:
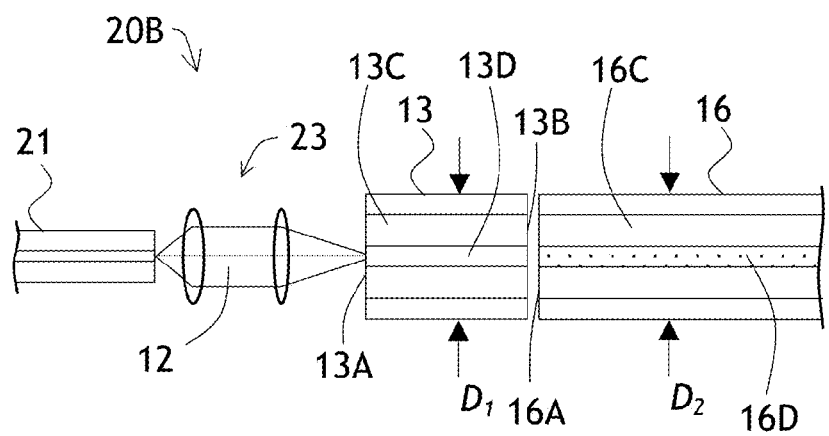
FIG. 2B is a schematic elevational view of a coupler for coupling light into a passive multimode optical fiber coupled to an active multimode optical fiber.

The role of the passive multimode optical fiber 13 will now be considered. Turning to FIG. 2B with further reference to FIGS. 1A and 2A, a fiber laser assembly 20B is an embodiment of the fiber assembly 10A of FIG. 1A, and is similar to the fiber assembly 20A of FIG. 2A. The fiber assembly 20B of FIG. 2B differs from the fiber assembly 20A of FIG. 2A by inclusion of the passive multimode optical fiber 13. The signal light 12 (FIG. 2B) emitted by the active singlemode optical fiber 21 is coupled by the lens system 23 into the first end 13A of the passive multimode optical fiber 13, which is coupled, e.g. fusion-spliced, at its second end 13B to the first end 16A of the active multimode optical fiber 16.

Referring specifically to FIG. 2B with further reference to FIG. 1B, when the signal light 12 (FIG. 2B) is coupled to the passive multimode optical fiber 13, an imperfect matching between a focal spot generated by the lens system 23 and the zero-order optical mode 14 of the passive multimode optical fiber 13, and/or an optical misalignment in the lens system 23 may cause launching of the higher-order optical mode 15 (FIG. 1B) along with the zero-order optical mode 14, so that the modes 14 and 15 co-propagate with the higher-order optical mode 15 in the passive multimode optical fiber 13. Due to the intermodal dispersion in the passive multimode optical fiber 13, the zero-order optical mode 14 and the higher-order optical mode 15 will travel different effective optical path lengths between the first 13A and second 13B ends of the passive multimode optical fiber 13. Since the signal light 12 has the non-zero spectral width $\Delta\lambda$, the difference in the effective optical path lengths of the zero-order optical mode 14 and the higher-order optical mode 15 will cause at least a partial loss of coherence between the zero-order optical mode 14 and the higher-order optical mode 15. This loss of coherence will result in a reduction of a contrast of the interference pattern between the zero-order optical mode 14 and the higher-order optical mode 15. The reduced contrast of the interference pattern will in its turn make the temperature distribution along the active multimode optical fiber 16 more even, which may consequently reduce an amplitude of the spatially varying refractive index profile, causing a reduction of intermodal coupling, and a corresponding reduction of modal instability.

The coherence of the signal light 12 may also be defined via coherence length of the signal light 12. The non-zero spectral width $\Delta\lambda$ of the signal light 12 results in a finite coherence length of the signal 12. The passive multimode optical fiber 13 receives the signal light 12 at the first end 13A. The signal light 12 propagates in the zero-order optical mode 14 and the higher-order optical mode 15 in the passive multimode optical fiber 13 towards its second end 13B. Upon such propagation, one of the zero-order 14 and higher-order optical mode 15 is delayed by a first distance with respect to the other optical mode due to intermodal dispersion in the passive multimode optical fiber 13. The first distance may be computed by a person skilled in the art from the optical and physical parameters of the passive multimode optical fiber 13. These parameters of the passive multimode optical fiber 13 may be selected such that the first distance is at least 1% of the coherence length of the signal light 12, more preferably at least 10%, and more preferably at least 100% of the coherence length of the signal light 12.

Still referring to FIG. 2B and FIG. 1B, it is preferable that the passive 13 and active 16 multimode optical fibers (FIG. 2B) are disposed coaxially, so that the coupling of the zero-order optical mode 14 to the first end 16A of the active multimode optical fiber 16 (FIG. 1B) substantially does not transfer optical power of the zero-order optical mode 14 to the higher-order optical mode 15 in the active multimode optical fiber 16. To that end, the passive 13 and active 16 multimode optical fibers may have respective outer diameters $D_1$ and $D_2$ differing from each other by less than 10%. Matching the diameters $D_1$ and $D_2$ facilitates fusion splicing of the passive 13 and active 16 multimode optical fibers. It is much easier for a commercial fusion splicer to splice the optical fibers 13 and 16 with matching diameters $D_1$ and $D_2$ with a negligible optical losses and intermodal energy transfer. It might also be preferable to match core numerical apertures of the passive 13 and active 16 multimode optical fibers to within than 10% of each other, for the same reason of avoiding the energy of the zero-order optical mode 14 to be transferred to higher optical modes, e.g. the non-zero optical mode 15. Even though the passive multimode optical fiber 13 is shown as a double-clad optical fiber having inner cladding 13C surrounding undoped core 13D, the passive multimode optical fiber 13 may also include a single-clad optical fiber, although the double-clad structure may be preferable for pumping related reasons. The active multimode optical fiber 16 is preferably a double clad fiber including an inner cladding 16C and a doped core 16D.

Figure 3:
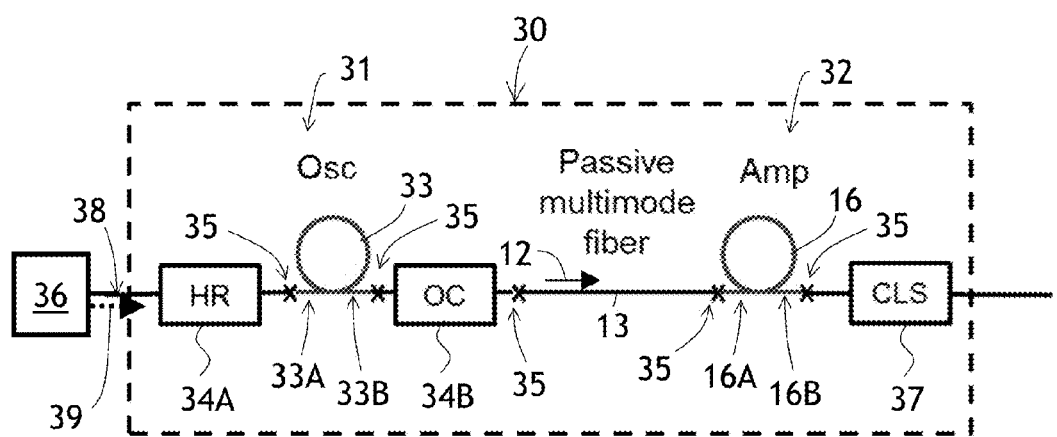
FIG. 3 illustrates a schematic block diagram of a master oscillator-power amplifier (MOPA) fiber laser.

Turning to FIG. 3 with further reference to FIG. 2B, a master oscillator-power amplifier (MOPA) fiber laser 30 may include the fiber laser assembly 20B of FIG. 2B. The MOPA fiber laser 30 (FIG. 3) includes a fiber oscillator 31, a fiber amplifier 32, and the passive multimode optical fiber 13 coupled between the fiber oscillator 31 and the fiber amplifier 32. The fiber oscillator 31 may include a length of active oscillator fiber 33 between first 33A and second 33B ends. The first end 33A of the active oscillator fiber 33 is coupled to a wavelength-selective high reflector (HR) 34A e.g. a fiber Bragg grating of typically >90% reflectivity, and the second end 33B of the active oscillator fiber 33 is coupled to a wavelength-selective output coupler (OC) 34B e.g. a fiber Bragg grating of typically <50% reflectivity. The active oscillator fiber 33 may be singlemode or multimode (in which case it is preferably forced to operate in a single mode using techniques well known in the art, e.g. U.S. Pat. No. 6,496,301 by Koplow et al., incorporated herein by reference), single clad or double clad optical fiber, depending on required output power and modal composition characteristics of the signal light 12.

In the embodiments of FIGS. 2B and 3, the passive multimode optical fiber 13 is a double clad fiber. The passive multimode optical fiber 13 is optically coupled at its first end 13A to the OC 34B at the second end 33B of the active oscillator fiber 33. In one embodiment, the passive multimode optical fiber 13 has a length of at least 1 mm. The active multimode optical fiber 16 is also a double clad fiber. The active multimode optical fiber 16 is optically coupled at its first end 16A to the second end 13B of the passive multimode optical fiber 13. Locations 35 marked with "X" signs denote fusion splices. In embodiments where the active oscillator fiber 33 is also a double-clad fiber, the inner cladding 13C and 16C may extend throughout the entire MOPA fiber laser 30, which makes it convenient to couple pump light 39 to a location 38 as shown in FIG. 3. This enables the pump light 39 to pump both the active oscillator fiber 33 and the active multimode optical fiber 16 with a single pump source 36. In other words, the pump source 36 is optically coupled at the location 38 to the first end 33A of the active oscillator fiber 33 for pumping the active oscillator fiber 33 and the active multimode optical fiber 16. Residual pump light may be removed from the inner cladding 16C (FIG. 2B) of the active multimode optical fiber 16 by a cladding light stripper (CLS) 37 (FIG. 3). The CLS 37 removes any residual pump light, as well as any laser light that is propagating in the fiber cladding 16C instead of the core 16D, before being delivered to an application, not shown. Other pumping configurations are of course possible, including direct pumping of the active multimode optical fiber 16. In the latter case, the active oscillator fiber 33 and the active multimode optical fiber 16 may be pumped by separate pump sources. The passive multimode optical fiber 13 may in this case be single-clad.

By way of a non-limiting example, when the active multimode optical fiber 16 of the MOPA 30 is doped with Ytterbium (Yb), so that the MOPA 30 operates at a wavelength λ of about 1070 nm to 1080 nm, the active multimode optical fiber 16 may have, for example, a 12.5-micron radius of the core 16D at the NA of 0.08, providing a V-number of $$V = 2\pi a \, NA/\lambda = 5.8 \quad (1)$$

The active multimode optical fiber 16 having the V-number of 5.8 may support up to 10 modes, with two polarizations apiece, unless the fiber is tightly coiled. The V-number of 5.8 may be used, for example, for over 100 W, in particular kilowatt-class continuous-wave or millisecond-pulsed lasers for cutting and welding of sheet metal, where singlemode beam quality is not required, and the use of the large multimode amplifier fiber provides efficient absorption of pump light and suppresses undesired nonlinear effects, such as stimulated Raman scattering and self-phase modulation. By way of a non-limiting example, the zero-order optical mode propagating in the active multimode optical fiber 16 may have a mode diameter of at least 15 micrometers.

The oscillator 31 generates the signal light 12 having the spectral width 42 that is typically on the order of 0.1 nm to 5 nm. The bandwidth is non-zero because the fiber Bragg gratings have a finite bandwidth, and also potentially because of nonlinearities in the oscillator 31. This magnitude of the spectral width 42 causes the modes 14 and 15 in multimode fibers to become incoherent with one another over relatively short distances. Specifically, the mutual coherence length $L_c$ of the modes in a fiber of refractive index n can be calculated approximately by the formula $$L_c = \pi^2 a^2 / (n\Delta\lambda), \quad (2)$$

which gives for the above 12.5-micron multimode amplifier fiber, assuming silica fiber with n=1.45 and Δλ=1 nm, a coherence length of 1.1 meters.

Although it may be preferable in some cases that the length of the passive multimode optical fiber 13 is such that coherence is completely lost between the zero-order 14 and higher-order 15 optical modes, it may be not required in practice, because modal instability is a threshold-determined process and, for as long as the threshold is not exceeded, the resulting beam quality may be adequate. Additionally, when very good mode matching is present between the passive multimode optical fiber 13 and the active multimode optical fiber 16 (for example core diameter matching within 10% and NA matching within 10%), then suppression of modal instability may be achieved with a length of the passive multimode optical fiber 13 that is considerably less than the coherence length, for example on the order of 1% of the coherence length. In practical terms, when the spectral width of the light source 11 (FIG. 2B) e.g. the oscillator 31 (FIG. 3) is between 1 nm and 5 nm, and wherein the length of the passive multimode optical fiber 13 may be selected to be least 5 mm. When the spectral width of the light source 11 (FIG. 2B) e.g. the oscillator 31 (FIG. 3) is between 0.1 nm and 1 nm, longer lengths of the passive multimode optical fiber 13 may be selected, e.g. least 50 mm. However, in order to have robust suppression of the modal instability even with imperfect mode matching, it is desirable to use a length of the passive multimode optical fiber 13 that is at least 10% of the coherence length, more preferably 100% of the coherence length.

When the active oscillator fiber 33 is a singlemode fiber, several modes may be present in the active multimode optical fiber 16, leading to an output beam quality with an $M^2$ parameter of typically 2 to 3. If a mode converter, not shown, is inserted between the input fiber and the amplifier fiber, then it is possible to launch most of the input light into the fundamental mode, or zero-order mode, of the active multimode optical fiber 16, but due to the limits of mode conversion technology, typically there will still be at least a few percent of the input light power present in higher-order modes. Thus, in the configurations of FIGS. 2B and 3, there will likely be at least two modes that are at least slightly excited at the start of the active multimode optical fiber 16.

The passive multimode optical fiber 13 may facilitate reduction of modal instabilities not only for a case where multiple modes are present as a result of mode mismatch upon launching the signal light 12 into the first end 13A of the multimode optical fiber 13, but also for the case where multiple modes are present in the signal light 12 itself, before launching into the passive multimode optical fiber 13. For this latter case, it may be advantageous to select a core diameter of the passive multimode optical fiber 13 to be less than a core diameter of the double clad active multimode optical fiber 16. This reduces the coherence length according to Eq. (2) above, allowing shorter lengths of the passive multimode optical fiber 13 to be used for coherence reduction.

Figure 4A:
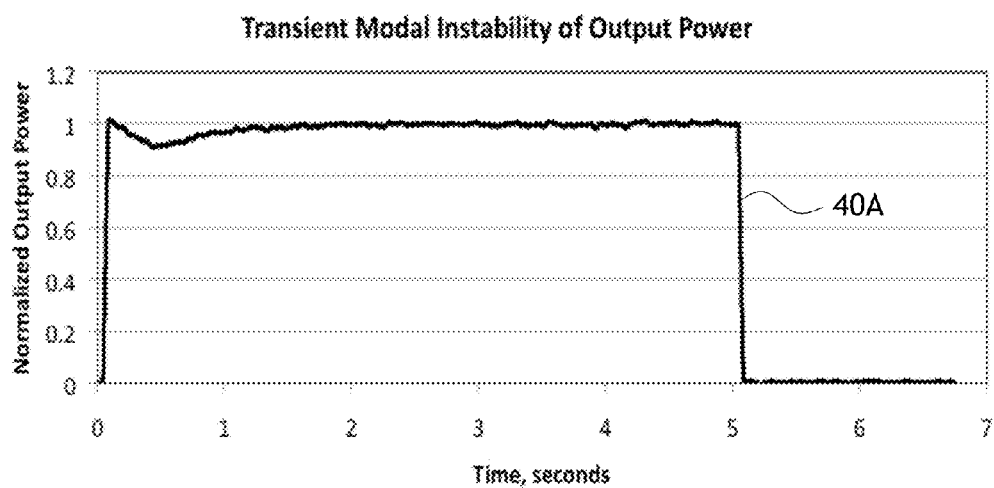
FIGS. 4A and 4B illustrate time traces of output optical power and rejected cladding light, respectively, of a high power MOPA fiber laser showing optical power variations due to modal instability.
Figure 4B:
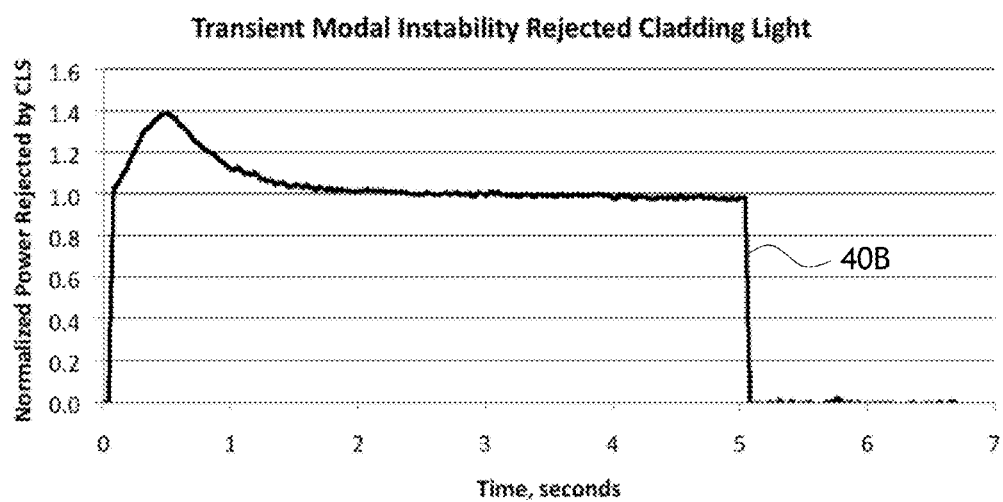

Experimental verification of the fiber laser assemblies 20B of FIG. 2B and 30 of FIG. 3 will now be presented. As a baseline, an experiment has been performed with the passive multimode optical fiber 13 omitted from fiber laser assemblies 20B and 30. Referring to FIGS. 4A and 4B with further reference to FIG. 3, modal instability has been observed for about 1 second after turn-on, then disappearing as the laser amplifier fiber comes to thermal equilibrium. The effect can be seen both as a transient reduction of the delivered output power (graph 40A in FIG. 4A) and as a corresponding transient increase in the cladding light being rejected by the CLS 37 (graph 40B in FIG. 4B).

Figure 5A:
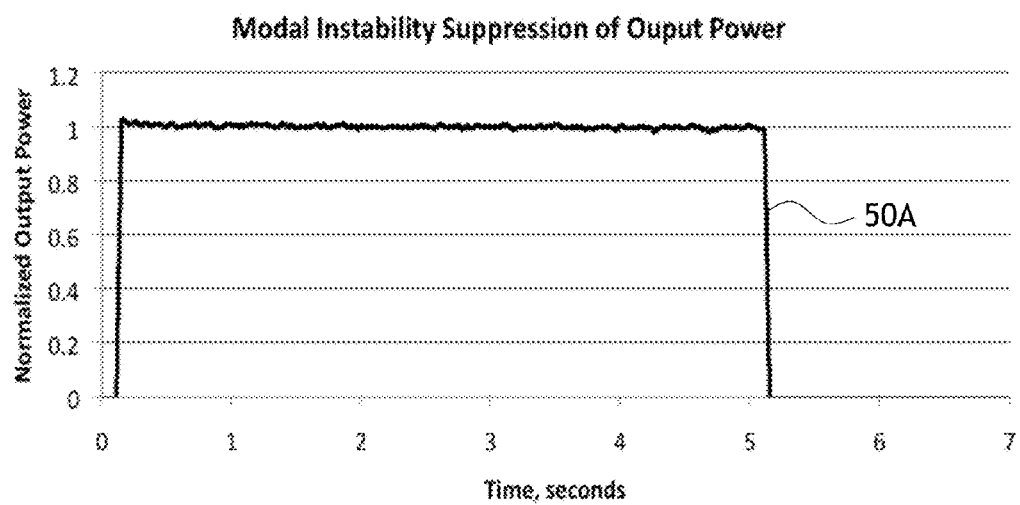
FIGS. 5A and 5B illustrate time traces of output optical power and rejected cladding light, respectively, of a high power MOPA fiber laser having the optical coupler of FIG. 3B, showing stable optical power levels.
Figure 5B:
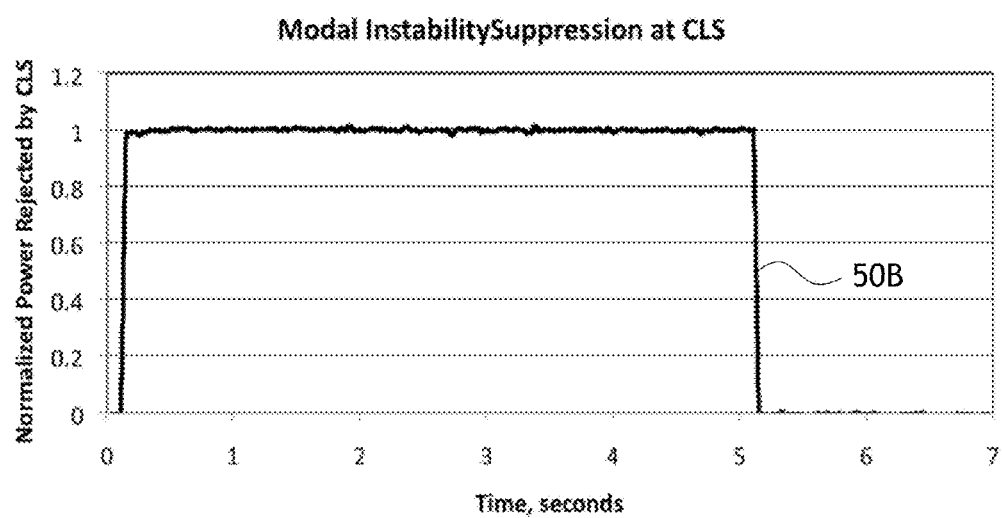

Turning now to FIGS. 5A and 5B, results of an experiment are presented where $L_1$=2.0 m long, radius a=11 micrometer of the core 13D, passive multimode optical fiber 13 has been included in the fiber laser assemblies 20B of FIG. 2B and 30 of FIG. 3. One can see from output power 50A and rejected cladding light power 50B graphs that the modal instability has been essentially eliminated.

Figure 6:
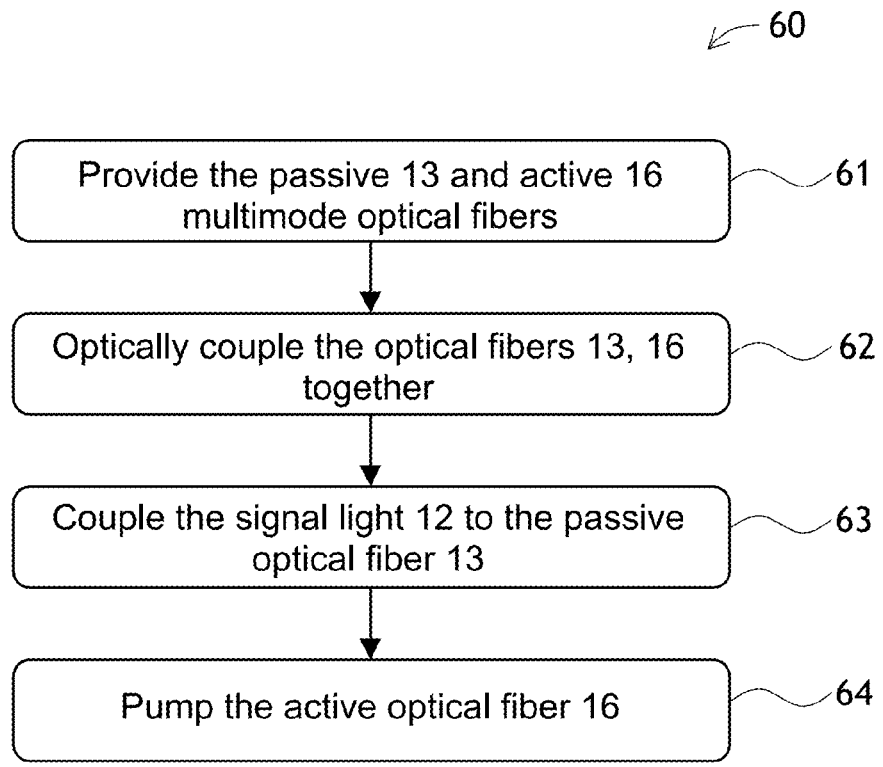
FIG. 6 illustrates a flow chart of a method for generating light at over 100 W power level.

Turning to FIG. 6 with further reference to FIGS. 1B and 3, a method 60 (FIG. 6) for generating light at over 100 W power level includes a step 61 of providing the passive 13 and active 16 multimode optical fibers each having opposed first 13A, 16A and second 13B, 16B ends respectively (FIG. 3). In a following step 62, the second end 13B of the passive multimode optical fiber 13 is optically coupled, e.g. spliced, to the first end 16A of the active multimode optical fiber 16. In a following step 63, the signal light 12 is coupled to the first end 13A of the passive multimode optical fiber 13. The signal light 12 has a non-zero spectral width $\Delta\lambda$. As a result of the coupling, the zero-order optical mode 14 of the signal light 12 co-propagates with the higher-order optical mode 15 (FIG. 1B) of the signal light 12 from the first 13A to the second 13B end of the passive multimode optical fiber 13. Upon such propagation, one of the zero-order 14 and higher-order 15 optical mode is delayed with respect to the other, and coherence between the zero-order 14 and higher-order 15 is reduced due to the non-zero spectral width $\Delta\lambda$ of the signal light 12. The coherence is reduced before the zero-order 14 and higher-order 15 optical modes are coupled to the first end 16A of the active multimode optical fiber 16.

Finally, in a step 64, the active multimode optical fiber 16 is pumped with the pump light 39 (FIG. 3), so as to amplify the zero-order optical mode 15 as the zero-order optical mode 15 propagates towards the second end 16B of the active multimode optical fiber 16.

As explained above, the optical coupling of the second step 62 may be performed by disposing the passive 13 and active 16 multimode optical fiber coaxially, so that the coupling of the third step 63 of the zero-order optical mode 14 to the first end 16A of the active multimode optical fiber 16 substantially does not transfer optical power of the zero-order optical mode 14 to the higher-order optical mode 15, or another high-order optical mode, of the active multimode optical fiber 16. Preferably, the passive 13 and active 16 multimode optical fibers have outer diameters $D_1$ and $D_2$ matching to within 10% of each other, so that the coupling step 62 may be performed by fusion splicing the second end 13B of the passive multimode optical fiber 13 to the first end 16A of the active multimode optical fiber 16. Further, preferably, the passive 13 and active 16 multimode optical fibers are double clad optical fibers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A fiber laser assembly comprising:
a light source for emitting signal light having a non-zero spectral width;
a length of passive multimode optical fiber between first and second ends thereof, optically coupled at the first end thereof to the light source for receiving the signal light and propagating the signal light in a zero-order optical mode and a higher-order optical mode in the passive multimode optical fiber towards the second end thereof,
wherein upon such propagation, one of the zero-order or higher-order optical modes is delayed with respect to the other optical mode so as to at least partially reduce coherence therebetween at the second end of the passive multimode optical fiber due to the non-zero spectral width of the signal light, and
wherein the length of passive multimode optical fiber is proportional to a coherence length of the signal light; and
a length of active multimode optical fiber between first and second ends thereof, optically coupled at the first end thereof to the second end of the passive multimode optical fiber, for receiving and amplifying the zero-order optical mode as the zero-order optical mode propagates towards the second end of the active multimode optical fiber.

2. The fiber laser assembly of claim 1, wherein the spectral width of the light source is between 1 nm and 5 nm, and wherein the length of the passive multimode optical fiber is at least 5 mm.

3. The fiber laser assembly of claim 1, wherein the spectral width of the light source is between 0.1 nm and 1 nm, and the length of the passive multimode optical fiber is at least 50 mm.

4. The fiber laser assembly of claim 1, wherein the length of the passive multimode optical fiber is such that coherence is completely lost between the zero-order and higher-order optical modes.

5. The fiber laser assembly of claim 1, wherein the passive and active multimode optical fibers include outer diameters differing from each other by less than 10%.

6. The fiber laser assembly of claim 5, wherein the passive and active multimode optical fibers include core numerical apertures differing from each other by less than 10%.

7. The fiber laser assembly of claim 5, wherein the light source comprises a fiber oscillator.

8. The fiber laser assembly of claim 7, wherein
the fiber oscillator comprises a length of double clad multimode oscillator fiber between first and second ends thereof;
the passive multimode optical fiber comprises a double clad passive multimode optical fiber optically coupled to the second end of the double clad multimode oscillator fiber;
the active multimode optical fiber comprises a double clad active multimode optical fiber optically coupled to the double clad passive multimode optical fiber; and the fiber laser assembly further comprises a pump source optically coupled to the first end of the double clad multimode oscillator fiber for pumping the double clad multimode oscillator fiber and the double clad active multimode optical fiber.

9. The fiber laser assembly of claim 8, wherein the length of the passive double clad multimode optical fiber is at least 1 mm.

10. The fiber laser assembly of claim 8, wherein a core diameter of the passive double clad multimode optical fiber is less than a core diameter of the double clad active multimode optical fiber.

11. The fiber laser assembly of claim 9, wherein in operation, the zero-order optical mode propagating in the active multimode optical fiber includes a mode diameter of at least 15 micrometers.

12. The fiber laser assembly of claim 8, rated for an average output optical power of at least 100 W.

13. A fiber laser assembly comprising:
a light source for emitting signal light having a finite coherence length;
a passive multimode optical fiber having opposed first and second ends and optically coupled at the first end thereof to the light source for receiving the signal light and propagating the signal light in a zero-order optical mode and a higher-order optical mode in the passive multimode optical fiber towards the second end thereof,
wherein upon such propagation, one of the zero-order or higher-order optical mode is delayed by a first distance with respect to the other optical mode due to intermodal dispersion in the passive multimode optical fiber to reduce coherence due to a spectral width of the signal light, and
wherein the first distance is at least 1% of the coherence length of the signal light; and
an active multimode optical fiber having opposed first and second ends and optically coupled at the first end thereof to the second end of the passive multimode optical fiber, for amplifying the zero-order optical mode as the zero-order optical mode propagates towards the second end of the active multimode optical fiber.

14. The fiber laser assembly of claim 13, wherein the passive and active multimode optical fibers include outer diameters matching to within 10% of each other.

15. The fiber laser assembly of claim 14, wherein the passive and active multimode optical fibers include zero-order mode diameters matching to within 10% of each other.

16. The fiber laser assembly of claim 15, wherein the light source comprises an active singlemode optical fiber.

17. A method comprising:
providing passive and active multimode optical fibers each having opposed first and second ends;
optically coupling the second end of the passive multimode optical fiber to the first end of the active multimode optical fiber;
coupling signal light having a non-zero spectral width to the first end of the passive multimode optical fiber, thereby causing a zero-order optical mode of the signal light to co-propagate with a higher-order optical mode of the signal light from the first to the second end of the passive multimode optical fiber,
wherein upon such propagation, one of the zero-order or higher-order optical mode is delayed with respect to the other, so as to at least partially reduce coherence therebetween due to the non-zero spectral width of the signal light, before the zero-order and higher-order optical modes are coupled to the first end of the active multimode optical fiber, and
wherein a length of the passive multimode optical fiber is proportional to a coherence length of the signal light; and
optically pumping the active multimode optical fiber, so as to amplify the zero-order optical mode as the zero-order optical mode propagates towards the second end of the active multimode optical fiber.

18. The method of claim 17, wherein the optically coupling is performed by disposing the passive and active multimode optical fibers coaxially, so that the coupling of the signal light substantially does not transfer optical power of the zero-order optical mode to a higher-order optical mode in the active multimode optical fiber.

19. The method of claim 18, wherein
the passive and active multimode optical fibers include outer diameters matching to within 10% of each other, and
the optically coupling comprises fusion splicing the second end of the passive multimode optical fiber to the first end of the active multimode optical fiber.

20. The method of claim 17, wherein providing the passive and active multimode optical fibers includes providing double clad passive and active multimode optical fibers.

* * * * *